US008638809B1

United States Patent
Goodson

(10) Patent No.: US 8,638,809 B1
(45) Date of Patent: Jan. 28, 2014

(54) SYSTEMS AND METHODS FOR COMPENSATING FOR REPETITIVE IMPULSE NOISE

(75) Inventor: Richard L. Goodson, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 1068 days.

(21) Appl. No.: 11/501,420

(22) Filed: Aug. 9, 2006

Related U.S. Application Data

(60) Provisional application No. 60/706,790, filed on Aug. 9, 2005.

(51) Int. Cl.
*H04B 7/216* (2006.01)

(52) U.S. Cl.
USPC .......................................................... 370/441

(58) Field of Classification Search
USPC ................... 375/148, 222, 219, 260; 370/441
See application file for complete search history.

(56) References Cited

U.S. PATENT DOCUMENTS

| | | | |
|---|---|---|---|
| 5,410,264 A | 4/1995 | Lechleider | |
| 6,052,420 A | 4/2000 | Yeap et al. | |
| 6,081,919 A | 6/2000 | Fujiwara et al. | |
| 6,546,057 B1 | 4/2003 | Yeap | |
| 6,895,546 B2 | 5/2005 | Ivry | |
| 2005/0008065 A1* | 1/2005 | Schilling | 375/148 |
| 2005/0053229 A1 | 3/2005 | Tsatsanis et al. | |
| 2006/0078044 A1* | 4/2006 | Norrell et al. | 375/222 |
| 2006/0083324 A1* | 4/2006 | DesJardins et al. | 375/260 |
| 2008/0232444 A1* | 9/2008 | Tzannes | 375/219 |

OTHER PUBLICATIONS

Ghobrial, et al., U.S. Appl. No. 11/373,841, entitled, "Adaptive Interference Canceling System and Method," filed Mar. 11, 2006.
Ghobrial, et al., U.S. Appl. No. 10/948,492, entitled, "System and Method for Canceling Impulse Noise," filed Sep. 23, 2004.
Richard Goodson, U.S. Appl. No. 11/295,357, entitled, "Data Communication System and Method," filed Dec. 6, 2005.
Richard Goodson, "VDSL2: REIN Coding for VDSL2," ITU, Telecommunication Standardization Sector, Geneva, May 16-27, 2005.
Goodson,et al., "ADSL: REIN Coding for ADSL2+," ITU, Telecommunication Standardization Sector, Geneva, May 16-27, 2005.
G. David Forney, Jr., "Burst-Correcting Codes for the Classic Bursty Channel," IEEE Transactions on Communications Technology, vol. Com-19, No. 5, Oct. 1971.

(Continued)

*Primary Examiner* — Mark Rinehart
*Assistant Examiner* — Gbemileke Onamuti
(74) *Attorney, Agent, or Firm* — Maynard, Cooper & Gayle, P.C.; Jon E. Holland

(57) ABSTRACT

The present disclosure generally pertains to systems and methods for compensating for repetitive impulse noise (REIN) affecting signals that are communicated over a telecommunication channel. A system in accordance with one exemplary embodiment of the present disclosure includes a transmitter and receiver that communicate over a telecommunication channel. The data is encoded by the transmitter using a forward error correction (FEC) algorithm, such as Reed-Solomon coding, before being transmitted over a telecommunication channel to the receiver. The REIN tracker analyzes the data received by the receiver in order to predict when future occurrences of REIN will likely affect the data being communicated over the channel. The REIN tracker then marks erasures in a received data stream based on its REIN predictions. A decoder then decodes FEC code words in the data stream based on the marked erasures.

19 Claims, 5 Drawing Sheets

(56) References Cited

OTHER PUBLICATIONS

Norrell, et al., "VDSL2: Proposal for Impulse Noise Mitigation Scheme for VDSL2," ITU, Telecommunication Standardization Sector, Stresa, Italy, Oct. 18-22, 2004.

Sederat, et al., "VDSL2: Frame-Blanking: A Simple and Effective Method for REIN Protection," ITU, Telecommunication Standardization Sector, Huntsville, AL, Mar. 21-25, 2005.

Hossein Sederat, "VDSL2: Multi-Rate Impulse Protection," ITU, Telecommunication Standardization Sector, Waikiki, Hawaii, Jan. 17-21, 2005.

Sederat, "VDSL2: Periodic Impulse Noise: How Predictable is it?," ITU, Telecommunication Standardization Sector, Geneva, Nov. 29-Dec. 3, 2004.

Jocobson, et al., "VDSL2: REIN, REIN, Go Away-The Return of Frame Blanking," ITU, Telecommunication Standardization Sector, Ghent, Belgium, Jun. 12-16, 2006.

* cited by examiner

US 8,638,809 B1

SYSTEMS AND METHODS FOR COMPENSATING FOR REPETITIVE IMPULSE NOISE

CROSS REFERENCE TO RELATED APPLICATION

This application claims priority to U.S. Provisional Patent Application No. 60/706,790, entitled "System and Method for Compensating for Repetitive Impulse Noise," and filed on Aug. 9, 2005, which is incorporated herein by reference.

RELATED ART

Repetitive impulse noise (REIN), which is characterized by repetitive bursts of high-amplitude noise, can degrade performance of communication occurring over a telecommunication channel by repetitively corrupting data being transmitted over such channel. REIN can be introduced via a variety of sources external to the communication channel, and discovering the source or sources of REIN can be problematic. Although each burst of REIN is usually of a relatively short duration, the cumulative effect of REIN over time can be quite significant.

Thus, telecommunication service providers are seeking solutions for mitigating the effects of REIN. In one proposed solution, referred to as "frame blanking," a receiver analyzes data received from a telecommunication channel to identify REIN patterns. Based on these patterns, the receiver predicts when future bursts of REIN will occur. A transmitter in communication with the receiver then uses this information to transmit data in a way that mitigates REIN.

In particular, based on information from the receiver, the transmitter refrains from inserting payload data into frames that are identified as being subject to corruption by predicted REIN. As an example, the transmitter may insert all zeros into such frames, referred to hereafter as "blanked frames," and insert the payload data into the other frames that are communicated to the receiver. Upon receiving the frames transmitted by the transmitter, the receiver discards each blanked frame, which is likely corrupted by REIN, and extracts payload data from the remaining frames.

Thus, if the receiver accurately predicts which frames are affected by REIN, then the effects of REIN can be limited to the discarded frames thereby preventing the REIN from affecting the frames containing payload data. Even if the receiver is unable to precisely predict each occurrence of REIN, frame blanking can nevertheless significantly mitigate the adverse effects of REIN.

Unfortunately, many standard transmitters are not currently designed to perform frame blanking. Thus, to enable frame blanking, an existing transmitter may need to be modified or replaced. In addition, frame blanking usually requires communication from the receiver to the transmitter so that the transmitter can be informed of which frames are subject to REIN. Enabling such communication can increase the complexity and costs of a telecommunication system. For example, an otherwise unnecessary feedback path or channel from the receiver to the transmitter may need to be installed and/or maintained to enable frame blanking. Further, some sort of synchronization between the receiver and transmitter over such a feedback path or channel may also be required. Moreover, better techniques for mitigating REIN are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for compensating for repetitive impulse noise (REIN) affecting signals that are communicated over a telecommunication channel. A system in accordance with one exemplary embodiment of the present disclosure includes a transmitter and receiver that communicate over a telecommunication channel. The data is encoded by the transmitter using a known or future-developed forward error correction (FEC) algorithm, such as Reed-Solomon coding, before being transmitted over a telecommunication channel to the receiver. The REIN tracker analyzes the data received by the receiver in order to predict when future occurrences of REIN will likely affect the data being communicated over the channel. The REIN tracker then identifies, based on its REIN predictions, which portions of the received data are likely affected by REIN. The REIN tracker marks such data as erasures. A decoder uses an erasure decoding algorithm to decode the received data based on the marked erasures.

Figure 1:
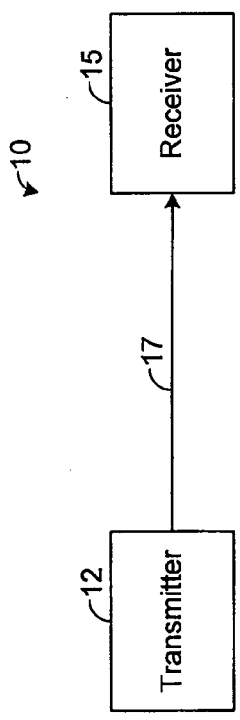
FIG. 1 is a block diagram illustrating a communication system in accordance with an exemplary embodiment of the present disclosure.

FIG. 1 depicts a communication system 10 in accordance with an exemplary embodiment of the present disclosure. As shown by FIG. 1, the system 10 comprises a transmitter 12 that is communicatively coupled to a receiver 15 via a telecommunication channel 17. The channel 17 may have wireless and/or non-wireless links. In one example, the channel 17 comprises a pair of conductive connections, sometimes referred to as a "twisted pair," extending from the transmitter 12 to the receiver 15. In other examples, other types and numbers of connections may be used to enable communication from the transmitter 12 to the receiver 15.

In some embodiments, the transmitter 12 and receiver 15 are employed within a network (not shown), such as the public switched telephone network (PSTN), for example. As a mere example, the transmitter 12 may reside at a central office, and the receiver 15 may reside at a customer premises. However, other locations for the transmitter 12 and/or receiver 15 are possible in other examples.

Further, various techniques may be used for the communication occurring between the transmitter 12 and the receiver 15. As an example, the transmitter 12 and receiver 15 may be configured to communicate digital subscriber line (DSL) signals (e.g., asymmetric digital subscriber line (ADSL), high-bit-rate digital subscriber line (HDSL), very-high-data-rate digital subscriber line (VDSL), etc.). In one exemplary embodiment, the transmitter 12 transmits digital multi-tone (DMT) signals across the channel 17 in accordance with VDSL2 standards. However, in other embodiments, the transmitter 12 and receiver 15 may be configured to communicate other types of signals.

During communication, the channel 17 may introduce impairments, such as REIN and/or other types of noise, that degrade the quality of the transmitted signals. Due to such impairments, the data recovered by the receiver 15 may include various errors. Forward error correction (FEC) algorithms may be used to enable the receiver 15 to correct for at least some of the errors caused by channel impairments.

In this regard, before transmitting data to the receiver 15, the transmitter 12 is configured to encode the data using a known or future-developed FEC algorithm, such as, for example, Reed-Solomon coding. In FEC, each code word includes data, sometimes referred to as "payload data," that is to be communicated to a receiver as well as redundant information about the payload data for enabling the receiver, in decoding the code words, to recover various bits of payload data that have been corrupted during transmission. Such redundant information will be referred to herein as "parity" information.

The number of errors that can be recovered per code word is limited depending on the robustness of the FEC scheme used and the amount of parity information included in each code word. Increasing the amount of parity information included in each code word generally increases the maximum number of errors that can be corrected per code word but also reduces throughput. In this regard, when parity information is increased, the added parity information occupies at least some transmission capacity that otherwise could be used to transmit payload data. In addition, more robust FEC schemes capable of correcting for more errors relative to less robust FEC schemes usually add delay to the decoding process. Thus, trade-offs in performance and quality of data exist when selecting the FEC scheme to be employed.

Figure 2:
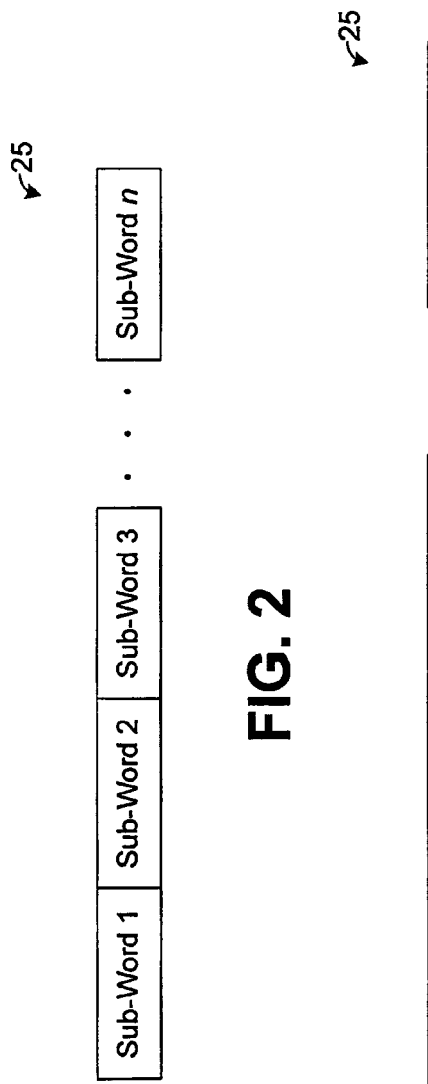
FIG. 2 is a block diagram illustrating an exemplary code word that may be communicated by the system depicted in FIG. 1.

FIG. 2 illustrates an exemplary FEC code word 25 that is transmitted by the transmitter 12. The code word 25 includes units of data, referred to as "sub-words." A "sub-word" can include any number of bits. For example, a sub-word may be a unit of data commonly referred to as an "octet," which has eight bits of data. However, it is possible for a sub-word to have other numbers of bits in other examples.

The code word 25 of FIG. 2 is shown as having n number of sub-words, where n can be any integer greater than 0. Some of the sub-words include payload data, and some of the sub-words include parity information pertaining to the payload data in the same FEC code word 25. It is possible for any of the sub-words to include both payload data and parity data. Moreover, the parity information may be used to correct at least some errors in the payload data of the same code word 25.

To help mitigate the effects of impulse noise, it is well-known for FEC code words to be interleaved prior to transmission over a channel. Thus, the code word 25 of FIG. 2 may be interleaved by the transmitter 12 such that the sub-words of FIG. 2 are separated by sub-words from other FEC code words being transmitted by the transmitter 12. Interleaving of FEC code words is generally described in commonly-assigned U.S. patent application Ser. No. 10/626,022, entitled "System and Method for Interleaving and Transmitting Forward Error Correction Code Words," and filed on Jul. 24, 2003, which is incorporated herein by reference. However, interleaving of code words is optional, and in at least some embodiments, the transmitter 12 may be configured to transmit FEC code words without interleaving.

Figure 3:
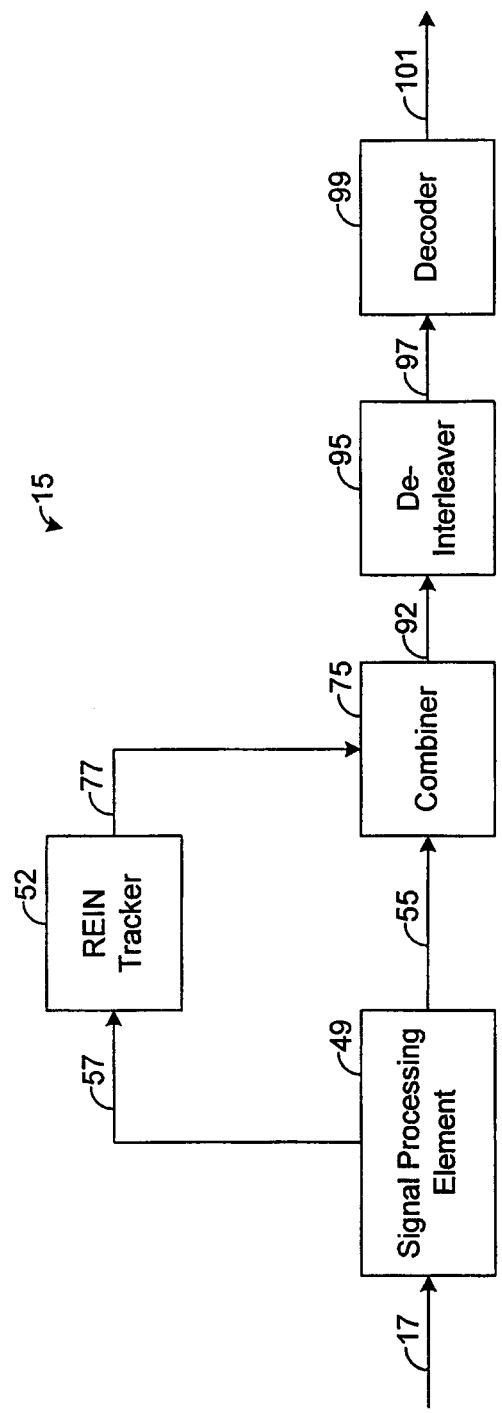
FIG. 3 is a block diagram illustrating a receiver, such as depicted in FIG. 1, in accordance with an exemplary embodiment of the present disclosure.

FIG. 3 depicts the receiver 15 in accordance with an exemplary embodiment of the present disclosure. The receiver 15 of FIG. 3 comprises a signal processing element 49 that is configured to receive signals from the telecommunication channel 17. The element 49 can be configured to perform various known processing and/or conditioning of the received signals, such as demodulating, filtering, and taking the discrete Fourier transform of the received signals. If the received signal is analog, the signal processing element 49 is configured to perform analog-to-digital conversion so that the signal processing element outputs a digital data stream 55 representative of the code words transmitted from the transmitter 12 (FIG. 1).

The signal processing element 49 is also configured to transmit a digital data stream 57 representative of the transmitted code words to a REIN tracker 52, which is coupled to the signal processing element 49 in the receiver 15, as shown by FIG. 3. The REIN tracker 52 is configured to track impulse noise affecting the data received from the signal processing element 49 so that the REIN tracker 52 can identify periodic patterns of REIN introduced by the channel 17. If a periodic pattern of REIN can be identified, then the REIN tracker 52 can use such patterns to predict future occurrences of REIN and thereby identify at least some sub-words as being corrupted by REIN. Such information may be useful in decoding the FEC code words, as will be described in more detail hereafter.

Note that the REIN tracker 52 can be implemented in hardware, software, or a combination thereof, and the REIN tracker 52 can track REIN in the time domain, the frequency domain, or a combination thereof. In an exemplary embodiment illustrated in FIG. 4, the REIN tracker 52, along with its associated methodology, is implemented in software and stored in memory 63 of an instruction execution device 65.

The REIN tracker 52, when implemented in software, can be stored and transported on any computer-readable medium for use by or in connection with an instruction execution device that can fetch and execute instructions. In the context of this document, a "computer-readable medium" can be any means that can contain, store, communicate, propagate, or transport a program for use by or in connection with the instruction execution device. The computer readable-medium can be, for example but not limited to, an electronic, magnetic, optical, electromagnetic, infrared, or semiconductor device or propagation medium.

Figure 4:
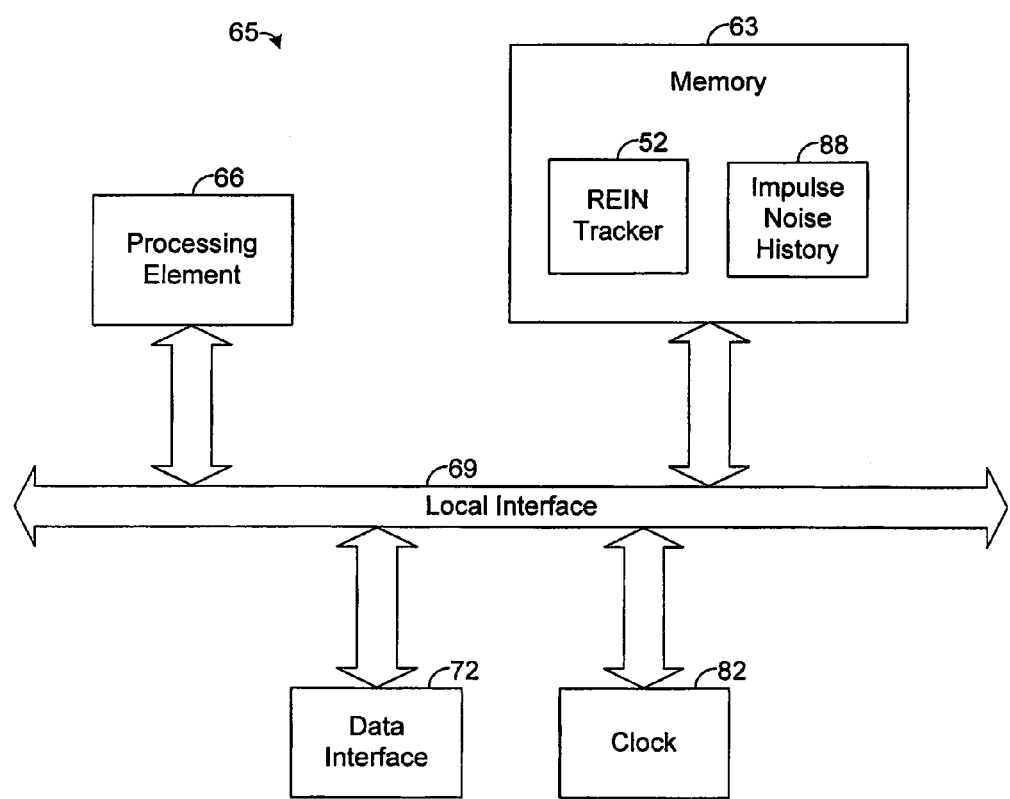
FIG. 4 is a block diagram illustrating an instruction execution device for executing a repetitive impulse noise (REIN) tracker, such as depicted in FIG. 3, for an exemplary embodiment in which the REIN tracker is implemented in software.

The exemplary embodiment of the device 65 depicted by FIG. 4 comprises at least one conventional processing element 66, such as a digital signal processor (DSP) or a central processing unit (CPU), that communicates to and drives the other elements within the REIN tracker 52 via a local interface 69, which can include at least one bus. Furthermore, a data interface 72 can be used to exchange data with the device 65. For example, the data interface 72 can be coupled to the signal processing element 49 and receive the digital data stream 57. The data interface 72 may also be coupled to a combiner 75 (FIG. 3) and transmit information to the combiner 75 via a data signal 77, as will be described in more detail hereafter. As shown by FIG. 4, the REIN tracker 52 also comprises a clock 82 that can be used to track time.

There are various ways that the REIN tracker 52 can determine which portions of the data stream 57 are affected by REIN. As an example, the REIN tracker 52 can determine the signal-to-noise ratio (SNR) of the received signals. Such a ratio can be calculated by the signal processing element 49 and provided to the REIN tracker 52 or can otherwise be determined by the REIN tracker 52. If the SNR of the received signals falls below a specified threshold for at least a specified length of time, the REIN tracker 52 can assume that the data from such signals has been corrupted by impulse noise. In other embodiments, other methodologies can be used to detect occurrences of impulse noise.

When the REIN tracker 52 detects an occurrence of impulse noise affecting the signals being received, the REIN tracker 52 stores data indicative of such occurrence in memory 63, thereby defining over time an impulse noise history 88. As an example, the impulse noise history 88 may have a plurality of entries. Each time the REIN tracker 52 detects an occurrence of impulse noise, the REIN tracker 52 may add an entry and include in the entry various information, such as the time and duration of the occurrence.

Thereafter, the REIN tracker 52 may analyze the impulse noise history 88 in an effort to identify one or more periodic patterns of REIN. If the REIN tracker 52 identifies a periodic pattern, the REIN tracker 52 can predict future occurrences of REIN that are associated with the same pattern. The REIN tracker 52 can then define the data signal 77 (FIG. 3) based on such predictions so that this signal 77 identifies which portions of the data stream 55 are likely affected by predicted occurrences of REIN.

In one exemplary embodiment, the signal 77 is a single bit signal that defines a flag, referred to herein as a "REIN flag," indicating whether the REIN tracker 52 has determined that the sub-word being received from stream 55 is likely affected by a predicted occurrence of REIN. For example, the REIN tracker 52 may assert the signal 77 when the combiner 75 is receiving a sub-word likely affected by a predicted occurrence of REIN, and the REIN tracker 52 may deassert the signal 77 when the combiner 75 is receiving a sub-word that is not likely affected by a predicted occurrence of REIN. Note that various other types of signals may be used to convey similar information to the combiner 75.

The combiner 75 preferably appends the REIN flag from signal 77 to the sub-word being received. Thus, in the instant embodiment, the data stream 92 transmitted from the combiner 75 includes one additional bit per sub-word as compared to the data stream 55 received by the combiner 75. If the FEC code words have been interleaved by the transmitter 12, then the receiver 15 preferably comprises a de-interleaver 95 that de-interleaves the sub-words thereby reconstructing the FEC code words originally transmitted by the transceiver 12 except that the sub-words now have REIN flags respectively appended to them.

Note that there are various ways that the de-interleaver 95 can process the sub-words and the REIN flags. For example, the de-interleaver 95 may buffer the sub-words and REIN flags in separate areas of memory (not specifically shown) while it is reconstructing the FEC code words. It is unnecessary for the de-interleaver 95 to store each REIN flag. For example, the de-interleaver 95 may store only asserted REIN flags and discard deasserted REIN flags. When the de-interleaver 95 is ready to output a particular sub-word, the de-interleaver 95 may determine whether the sub-word is associated with an asserted REIN flag stored in memory. If so, the de-interleaver 95 appends an asserted REIN flag to the sub-word. Otherwise, the de-interleaver 95 appends a deasserted REIN flag. Thus, the sub-words determined by the REIN tracker 52 to be corrupted by REIN have asserted REIN flags appended to them, and the other sub-words have deasserted REIN flags appended to them, as described above.

Alternatively, the de-interleaver 95 may store, in memory, only deasserted REIN flags. In such an example, the de-interleaver 95 appends a deasserted REIN flag to each sub-word output from the de-interleaver 95 only if this sub-word is associated with a deasserted REIN in memory. Otherwise, the de-interleaver 95 appends an asserted REIN flag to the sub-word.

In another example, the de-interleaver 95 may buffer the REIN flags and the sub-words in the same area of memory such that the REIN flags remain appended to the sub-words during buffering. In such an example, there is no need for the de-interleaver 95 to append information to the sub-words being output as is described in the foregoing examples for which the REIN flags are separated from the sub-words in the de-interleaver 95.

Figure 5:
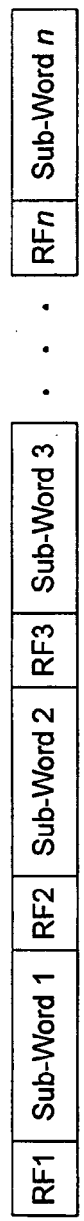
FIG. 5 is a block diagram illustrating the code word of FIG. 2 after it has passed through a de-interleaver depicted in FIG. 3.

FIG. 5 depicts the FEC code word 25 of FIG. 2 once the code word 25 has been transmitted to the receiver 15 and de-interleaved by the de-interleaver 95. As shown by FIG. 5, each sub-word has a REIN flag (RF) appended to it by the combiner 75. The appended REIN flag indicates whether the REIN tracker 52 has determined that the sub-word to which it is appended is affected by a predicted occurrence of REIN. For example, a first REIN flag, "RF1," is appended to a first sub-word, "sub-word 1," and indicates whether the REIN tracker 52 has determined that sub-word 1 is affected by a predicted occurrence of REIN. Similarly, a second REIN flag, "RF2," is appended to a second sub-word, "sub-word 2," and indicates whether the REIN tracker 52 has determined that sub-word 2 is affected by a predicted occurrence of REIN. Further, a third REIN flag, "RF3," is appended to a third sub-word, "sub-word 3," and indicates whether the REIN tracker 52 has determined that sub-word 3 is affected by a predicted occurrence of REIN. The remaining sub-words also have a respective REIN flag attached to them in a similar manner.

Note that the REIN flag appended to a given sub-word is not necessarily an accurate representation of whether the sub-word is actually affected by REIN. For example, the REIN tracker 52 may be unable to identify all possible patterns of REIN and/or may be unable to predict at least some actual occurrences of REIN. Thus, some sub-words may be corrupted by REIN even though the appended REIN flag indicates that the REIN tracker 52 has not predicted that this sub-word is affected by REIN. In addition, precisely determining when a predicted occurrence of REIN will start may be difficult. Time differences in the actual occurrences of REIN and the predicted occurrences may cause the REIN tracker 52 to incorrectly indicate that some sub-words are corrupted by REIN when, in fact, they are not so affected. Such time differences also may cause the REIN tracker 52 to incorrectly indicate that some sub-words are not corrupted by REIN when, in fact, they are so affected. As will be described in more detail hereafter, such inaccuracies can be tolerated, particularly if the REIN tracker 52 is relatively accurate in its predictions for many of the sub-words being processed.

Note that, even after identifying a particular pattern of REIN, the REIN tracker 52 may continue to monitor the REIN occurrences via signal 57 in order to detect timing variations that may occur with the pattern and/or to identify other REIN patterns. For example, the period between successive occurrences of the same identified pattern may drift with time. The REIN tracker 52 may continue to monitor the actual occurrences of such pattern to detect the drift so that its predictions relating to this pattern can be adjusted over time to compensate for this drift.

As shown by FIG. 3, the FEC code words de-interleaved by the de-interleaver 95 are transmitted, as data stream 97, to a decoder 99. The decoder 99 decodes the FEC code words in the data stream 97 to recover the payload data originally encoded by the transmitter 12. The decoder 99 then transmits this recovered data as data stream 101.

The decoder 99 is preferably configured to use erasure decoding to decode the FEC code words from the data stream 97. In this regard, erasure decoding is a known decoding technique whereby a decoder is provided with information marking at least some bits of a received data stream as being in error. If the locations of the errors are known a priori, then the decoder 99 can correct for more errors than if the decoder 99 must use the parity information in the FEC code words to discover the error locations. Indeed, an erasure decoder can typically correct for twice as many errors if the locations of all such errors are marked as compared to an example in which none of the error locations are known a priori. Note that a unit of data marked as being in error prior to the decoding process is referred to as an "erasure."

In decoding a FEC code word from data stream 97, the decoder 99 treats each sub-word having an asserted REIN flag as an erasure. As described above, each such sub-word has been determined by the REIN tracker 52 to be corrupted by REIN and will be referred to hereafter as a "REIN sub-word." The remaining sub-words, which have deasserted REIN flags, will be referred to hereafter as "non-REIN sub-words." Moreover, by asserting the REIN flag of the sub-words predicted to be affected by REIN, the REIN tracker 52 marks such sub-words as erasures that are to be corrected by the decoder 99 using erasure decoding.

In this regard, the decoder 99 assumes that each bit in each REIN sub-word is in error and uses the FEC information in the same code word to correct for such bits to the extent allowed by the parity information in the code word. Since it is unnecessary for the decoder 99 to use the parity information in the FEC code word to identify error locations within the REIN sub-words, the decoder 99 can correct many more errors than would otherwise be possible. Note that if it is possible to determine prior to decoding that errors exist in some of the non-REIN sub-words, these non-REIN sub-words may also be marked as erasures in order to enhance the error correction capacity of the decoder 99.

If there is still at least some error correcting capacity available after the correction of the erasures (e.g., the REIN sub-words), then the decoder 99 may perform error correction on the sub-words that have not been marked as erasures. However, for such sub-words, the decoder 99 may need to utilize the parity information of the FEC code words to discover the locations of errors thereby reducing the number of errors that could otherwise be corrected had such errors been discovered prior to decoding.

Moreover, by predicting which sub-words are corrupted by REIN and then providing the decoder 99 with such information, the REIN tracker 52 enables the decoder 99 to use erasure decoding to correct for a significantly higher number of errors than would otherwise be possible if the decoder 99 attempted to correct for errors using non-erasure decoding. Thus, the decoder 99 can correct many of the errors caused by predicted occurrences of REIN as well as possibly errors caused by other types of noise. Accordingly, the adverse effects of REIN can be mitigated.

Further, it is worth noting that the techniques described above for compensating for REIN are transparent to the transmitter 12. Thus, conventional transmitters can be employed without modification, and it is unnecessary for a feedback path or channel to be established.

It can be seen from the foregoing description that the REIN tracker 52 does not need to perfectly predict each occurrence of REIN. For example, if the REIN tracker 52 incorrectly predicts that a sub-word is corrupted by REIN when, in fact, it is not, then the decoder 99 will treat the sub-word as an erasure. In such an example, the decoder 99 corrects the sub-word, thereby accurately regenerating the sub-word. Thus, the erroneous prediction should not generate any data errors. However, correcting for the sub-word usurps some of the error correction capacity that otherwise could have been used to correct for errors in other sub-words.

If, on the other hand, the REIN tracker 52 incorrectly predicts that a sub-word is not corrupted by REIN when it is, in fact, so corrupted, the decoder 99 may nevertheless correct for such errors if there is sufficient error correction capacity available after the erasures in the same code word have been corrected. By enabling the decoder 99 to employ erasure decoding to correct at least some of the sub-words corrupted by predicted occurrences of REIN, the overall error correction capacity of the decoder 99 is generally enhanced.

Moreover, in general, the more accurately that the REIN tracker 52 can predict occurrences of REIN, the better that the decoder 99 can decode the FEC code words and correct for errors. Thus, it is desirable for the REIN tracker 52 to predict REIN as accurately as possible, but as noted above, errors in the prediction process are tolerable.

In some embodiments, it may be desirable for the REIN tracker 52 to begin marking some of the sub-words as erasures just prior to an expected occurrence of REIN in order to ensure that a greater number of the affected sub-words are marked as erasures in the event that the expected occurrence actually begins sooner than expected. For example, if the REIN tracker 52 determines that a particular sub-word is the first sub-word likely to be affected by a predicted occurrence of REIN, the REIN tracker 52 may begin asserting the REIN flags of x preceding sub-words, where x is any integer greater than 0. Further, if the REIN tracker 52 determines that a particular sub-word is the last sub-word likely affected by a predicted occurrence of REIN, the REIN tracker 52 may continue asserting the REIN flags of y subsequent sub-words, where y is any integer greater than 0. Increasing x or y generally increases the margin of error for the REIN tracker 52 in predicting the beginning and end of a particular occurrence of REIN to help ensure that each sub-word actually affected by a predicted occurrence of REIN is marked as an erasure. However, increasing x or y also is likely to increase the overall number of sub-words incorrectly marked as erasures thereby needlessly reducing the overall number of actual errors that can be corrected by the selected FEC scheme. Thus, trade-offs exists in selecting the margin of error, if any, that is to be applied to the decisions of the REIN tracker 52.

Note that the REIN tracker 52 may be implemented in a receiver 15 that receives signals having data arranged in frames. For example, when the signal processing element 49 performs a discrete Fourier transform on a DMT signal, the resulting FEC code words are arranged in frames, as is known in the art. Each frame is usually is usually associated with one or more tones or frequency ranges. In addition, an occurrence of impulse noise may affect all tones. Therefore, based on a single predicted occurrence of REIN, the REIN tracker 52 may be configured to mark an entire frame or even multiple frames as erasures. Moreover, the REIN tracker 52 may be configured to assume that an occurrence of REIN affects all tones and, therefore, mark the sub-words accordingly without actually making separate marking determinations for at least some of the tones. In another example, the REIN tracker 52 may be configured to determine whether each tone is affected by a predicted occurrence of REIN and mark the affected sub-words accordingly.

As described above, various techniques can be used by the REIN tracker 52 to identify occurrences of impulse noise. In one example described above, the REIN tracker 52 uses the SNR of received signals to determine which signals are affected by REIN. However, in another example, information from the decoder 99 may be used to identify occurrences of impulse noise. As described above, when FEC is employed, the decoder 99 is able to detect locations of errors and to correct for these errors to the extent that such errors do not exceed the correction capacity of the decoding scheme. Further, the decoder 99 is able to detect when more errors occur than can be corrected. Moreover, the decoder 99 can be configured to provide an error signal to the REIN tracker 52 indicating which sub-words are determined to contain errors or if more errors occurred than could be corrected. The REIN tracker 52 may use such information to identify occurrences of impulse noise.

Figure 6:
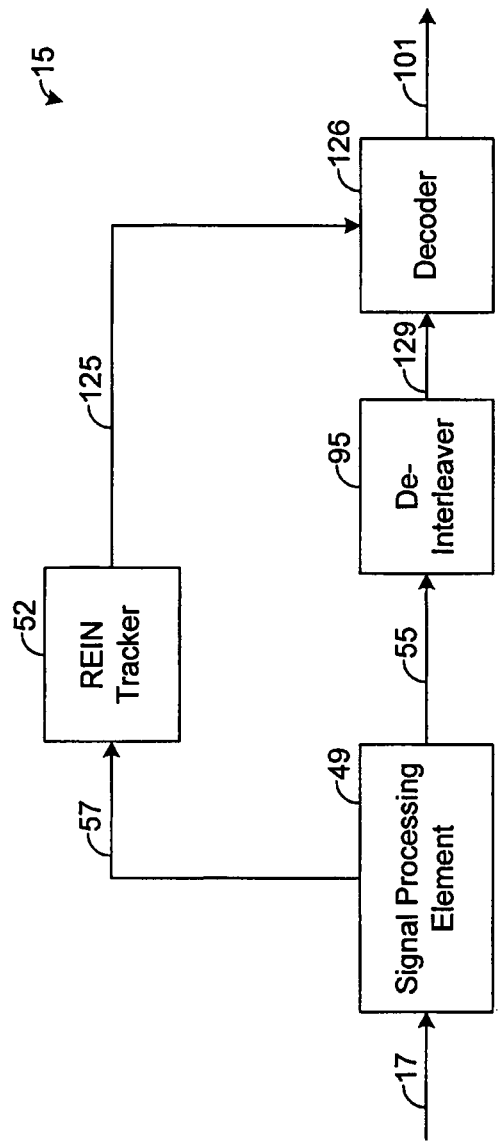
FIG. 6 is a block diagram illustrating a receiver, such as depicted in FIG. 1, in accordance with an exemplary embodiment of the present disclosure.

Furthermore, in an example described above, the REIN tracker 52 indicates which sub-words are likely affected by predicted occurrences of REIN by providing such information to a combiner 75, which then appends an appropriate REIN flag to each sub-word. However, there are other ways that such information can be conveyed to the decoder 99. For example, FIG. 6 depicts an exemplary embodiment of the receiver 15 in which the REIN tracker 52 provides a data signal 125 directly to an erasure decoder 126, which decodes a digital data stream 129 from the de-interleaver 95. Like the data signal 77 of FIG. 3, the data signal 125 may be a one-bit signal, and this signal 125 may indicate whether or not the sub-word being received by the decoder 126 is an erasure. Moreover, the operation of the receiver 15 in such an embodiment is similar to that of the embodiment shown by FIG. 3 except that the REIN flags are not appended to the sub-words but are instead transmitted directly to the decoder 126. In other embodiments, various other changes to the embodiments specifically described herein are possible and would be apparent to one of ordinary skill in the art upon reading this disclosure.

However, marking the erasures prior to the de-interleaving performed by de-interleaver 95 may facilitate the erasure marking algorithm. In this regard, when the erasure marking is performed prior to de-interleaving, the REIN tracker 52 can mark each sub-word consecutively received by the combiner 75 for a specified time interval per each predicted occurrence of REIN. If the erasure marking is performed after de-interleaving, then the REIN tracker 52 may need to account for the de-interleaving possibly complicating the algorithm to correctly mark the erasures.

An exemplary operation and use of the communication system 10 is described in more detail below with particular reference to FIG. 7.

Assume that the communication system 10 is configured according to FIG. 3 and that a particular source of REIN generates a 100 micro-second (μsec) noise impulse in the channel 17 every 8 milli-seconds (msec). As depicted by block 211 of FIG. 7, the REIN tracker 52 analyzes the data stream 57 in an effort to detect when this data stream 57 is corrupted by impulse noise. For each detection of an occurrence of impulse noise, the REIN tracker 52 updates the impulse noise history 88 so that this data reflects the detected occurrence of impulse noise.

Initially, while the REIN tracker 52 is analyzing the data stream 57, the REIN tracker 52 deasserts the data signal 77 thereby marking the received code words as non-erasures. In this regard, the REIN tracker 52 determines when the combiner 75 receives a new sub-word, as depicted by block 216 of FIG. 7. When a new sub-word is received, the REIN tracker 52 makes a determination in block 221 that the sub-word is not corrupted by REIN. Note that the sub-word, in actuality, may be corrupted by REIN, but the REIN tracker 52 has not yet recognized any REIN patterns. Thus, the REIN tracker 52 may erroneously make a "no" determination in block 221, but as described above, such an error can be tolerable.

Upon making a "no" determination in block 221, the REIN tracker 52 marks the new sub-word being received by the combiner 75 as a non-erasure by deasserting the signal 77 in block 225. Based on the deasserted signal 77, the combiner 75 appends a deasserted REIN flag to the new sub-word and then transmits the new sub-word to the decoder 99 through the de-interleaver 95, as depicted by block 228. Therefore, upon receiving the new sub-word, the decoder 99, based on the deasserted REIN flag, determines that sub-word is not an erasure and decodes the sub-word accordingly. In this regard, the decoder 99 uses the parity information in the same code word to discover locations of errors, if any, in the sub-word and corrects for these errors to the extent possible depending on the FEC scheme, parity information in the same code word, and the number of other errors in the same code word. The aforementioned process is repeated for each sub-word until the REIN tracker 52 is able to make a "yes" determination in block 221. Thus, until then, each sub-word is marked as a non-erasure.

At some point, the REIN tracker 52, based on the impulse noise history 88, recognizes a pattern of REIN. In particular, the REIN tracker 52 recognizes that an occurrence of REIN is occurring for about 100 μsec every 8 msec in the instant example. Thus, the REIN tracker 52 predicts that a 100 μsec occurrence of REIN will occur 8 msec after the previous occurrence of REIN within this detected pattern.

Figure 7:
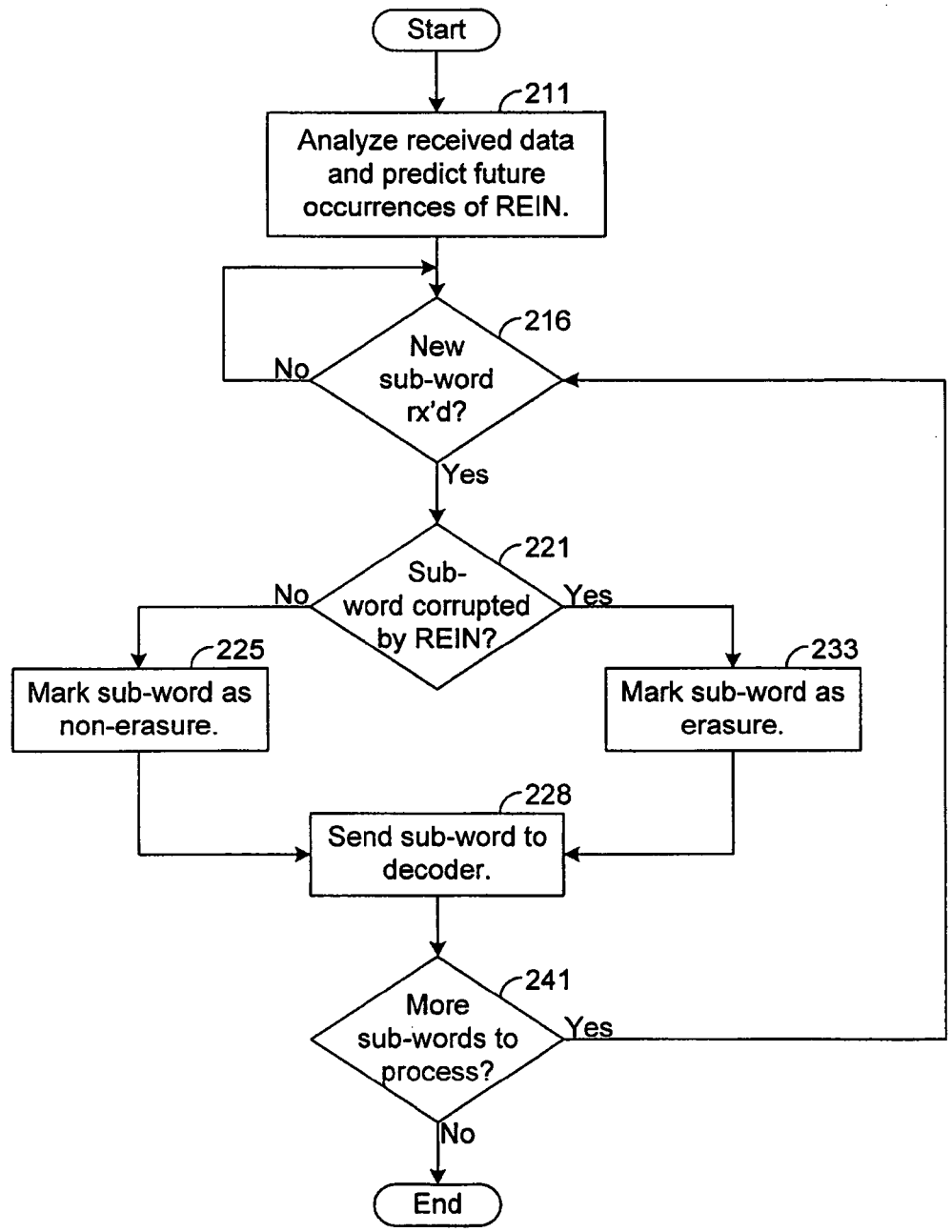
FIG. 7 is a flow chart illustrating an exemplary use and operation of the receiver depicted in FIG. 3.

Accordingly, 8 msec after the previous occurrence of REIN within the foregoing pattern, the REIN tracker 52 makes a "yes" determination in block 221 of FIG. 7. The REIN tracker 52 then marks the sub-word being received by the combiner 75 as an erasure, as depicted by block 233 of FIG. 7. In particular, the REIN tracker 52 asserts the signal 77. Based on the asserted signal 77, the combiner 75 appends an asserted REIN flag to the sub-word and then transmits the sub-word to the decoder 99 through the de-interleaver 95, as depicted by block 228. Therefore, upon receiving the sub-word, the decoder 99, based on the asserted REIN flag, determines that the sub-word is an erasure and decodes the sub-word accordingly. In this regard, the decoder 99 assumes that the sub-word is erred, and uses the parity information in the same code word to determine the value of each such bit to the extent possible depending on the FEC scheme, parity information in the same code word, and the number of other errors in the same code word. Since it is unnecessary for the decoder 99 to use the parity information to discover the locations of the errors in the current sub-word, the decoder 99 is able to correct for a higher number of errors than would otherwise be possible.

The REIN tracker 52 continues marking sub-words as erasures for about 100 μsec or, in other words, until the end of the predicted occurrence of REIN. The REIN tracker 52 may make additional predictions of REIN occurrences based on the same pattern or other patterns that may also be identified by the REIN tracker 52. Moreover, each sub-word that is received during a predicted occurrence of REIN is marked as an erasure, and each sub-word that is received during another period is marked as a non-erasure.

Note that, even after identifying a pattern of REIN and beginning to mark some of the sub-words as erasures, the REIN tracker 52 may continue analyzing the data stream 57 in effort to detect additional REIN patterns and/or to update REIN patterns already detected. If communication between the transmitter 12 and receiver 15 ends, the REIN tracker 52 may determine, in block 241 of FIG. 7, that no more sub-words are to be processed, and the process depicted by FIG. 7 may end.

Moreover, by marking at least some of the sub-words corrupted by predicted REIN as erasures, the overall error correction capacity of the receiver 15 can be enhanced thereby mitigating the effects of REIN.

Now, therefore, the following is claimed:

1. A system for compensating for repetitive impulse noise (REIN), comprising:
   a REIN tracker configured to identify, based on a plurality of noise impulses occurring during different time intervals prior to a reception of a forward error correction (FEC) code word from a telecommunication channel, a pattern of periodic REIN affecting signals received from the telecommunication channel, the REIN tracker further configured to make a prediction when a future noise impulse will likely occur based on the identified pattern and to mark as an erasure a sub-word of the FEC code word likely affected by the predicted noise impulse based on the prediction; and
   an erasure decoder configured to decode the FEC code word based on whether the sub-word is marked as the erasure during decoding of the sub-word.

2. The system of claim 1, wherein the REIN tracker is configured to create an impulse noise history based on the plurality of noise impulses and to identify the pattern based on the impulse noise history.

3. The system of claim 1, further comprising:
   a de-interleaver configured to de-interleave a stream of FEC code words, the stream of FEC code words including the sub-word; and
   a combiner configured to combine information with the sub-word based on the prediction prior to the sub-word being de-interleaved by the de-interleaver.

4. The receiver of claim 1, further comprising a signal processing element configured to receive the FEC code word from the telecommunication channel, wherein the prediction is performed by the REIN tracker prior to reception of the sub-word by the signal processing element.

5. A receiver, comprising:
   a signal processing element configured to receive signals from a telecommunication channel;
   a repetitive impulse noise (REIN) tracker configured to track REIN affecting the signals and to make a prediction of when a future noise impulse will likely occur based on the tracked REIN, the REIN tracker further configured to mark as an erasure a sub-word of a forward error correction (FEC) code word based on the prediction, wherein the prediction indicates that the sub-word is likely affected by the predicted noise impulse; and
   a decoder configured to decode the FEC code word and to correct for errors in the sub-word based on whether the REIN tracker has marked the sub-word as an erasure.

6. The receiver of claim 5, wherein the REIN tracker is configured to detect REIN occurrences based on the signals and to store data indicative of previously detected REIN occurrences, and wherein the REIN tracker is configured to mark the sub-word as the erasure based on the data.

7. The receiver of claim 5, further comprising a de-interleaver configured to de-interleave a stream of FEC code words, the stream of FEC code words including the sub-word wherein the REIN tracker is configured to mark the sub-word as the erasure prior to the at least sub-word being de-interleaved by the de-interleaver.

8. The receiver of claim 7, further comprising a combiner configured to combine a REIN flag with the sub-word based on whether the sub-word is marked as the erasure by the REIN tracker.

9. The receiver of claim 5, wherein the prediction is performed by the REIN tracker prior to reception of the sub-word by the receiver.

10. A method for compensating for repetitive impulse noise REIN, comprising the steps of:
    detecting occurrences of REIN affecting signals communicated over a telecommunication channel;
    storing in memory data indicative of the occurrences of REIN based on the detecting step;
    receiving a forward error correction (FEC) code word from the telecommunication channel;
    predicting, prior to the receiving step, a future occurrence of REIN based on the data;
    determining, based on the predicting step, that a sub-word of the FEC code word is likely affected by REIN, wherein the sub-word is communicated across the telecommunication channel when the future occurrence of REIN is predicted to occur by the predicting step;
    marking a sub-word of the FEC code word as an erasure for a decoder based on the determining step; and
    decoding the FEC code word via the decoder based on the marking step.

11. The method of claim 10, further comprising the steps of:
    de-interleaving a stream of FEC code words, the stream of FEC code words including the sub-word; and
    combining information, based on the predicting step, with the sub-word prior to de-interleaving of the sub-word by the de-interleaving.

12. The method of claim 10, further comprising the step of identifying a pattern of periodic REIN based on the detecting step, wherein the predicting step is based on the identified pattern.

13. A method for compensating for repetitive impulse noise (REIN), comprising the steps of:
    detecting occurrences of REIN affecting signals communicated over a telecommunication channel;
    storing in memory data indicative of the occurrences of REIN based on the detecting step;
    predicting future occurrences of REIN based on the data;
    receiving a forward error correction (FEC) code word from the telecommunication channel after the predicting step;
    indicating that a sub-word of the FEC code word is corrupted based on the predicting step, wherein the predicting step indicates that the sub-word is likely affected by one of the predicted occurrences of REIN; and
    decoding the FEC code word via a decoder coupled to the telecommunication channel, wherein the decoding step comprises the step correcting for at least one error in the sub-word based on the indicating step.

14. The method of claim 13, wherein the indicating step comprises the step of marking the sub-word as an erasure, and wherein the decoding step is based on the marking step.

15. The method of claim 13, further comprising the step of de-interleaving a stream of FEC code words, the stream of FEC code words including the sub-word, wherein the indicating step comprises the step of combining information with the sub-word prior to de-interleaving of the sub-word by the de-interleaving step.

16. The method of claim 13, further comprising the step of identifying a pattern of periodic REIN based on the detecting step, wherein the predicting step is based on the identified pattern.

17. A method for compensating for repetitive impulse noise (REIN), comprising the steps of:
- receiving a plurality of forward error correction (FEC) code words via a receiver from a telecommunication channel;
- identifying occurrences of REIN that affect the FEC code words;
- storing in memory data indicative of the occurrences of REIN based on the identifying step;
- predicting, based on the data, a future occurrence of REIN prior to reception of a sub-word of one of the FEC code words by the receiver;
- determining that the sub-word is likely corrupted by the predicted occurrence of REIN based on the predicting step;
- marking the sub-word as an erasure in response to the determining step, wherein the marking step is not based on an amount of noise actually affecting the sub-word; and
- decoding the one FEC code word via a decoder based on the marking step.

18. The method of claim 17, further comprising the step of de-interleaving a stream of FEC code words, the stream of FEC code words including the sub-word, wherein the marking step comprises the step of combining information, based on the determining step, with the sub-word prior to de-interleaving of the sub-word by the de-interleaving step.

19. The method of claim 17, further comprising the step of identifying a pattern of periodic REIN based on the data, wherein the predicting step is based on the identified pattern.

* * * * *